Feb. 14, 1956        A. E. TRAVER        2,734,377
APPARATUS FOR DETECTING CONTAMINATION OF A LIQUID
Filed Oct. 6, 1952        3 Sheets-Sheet 2
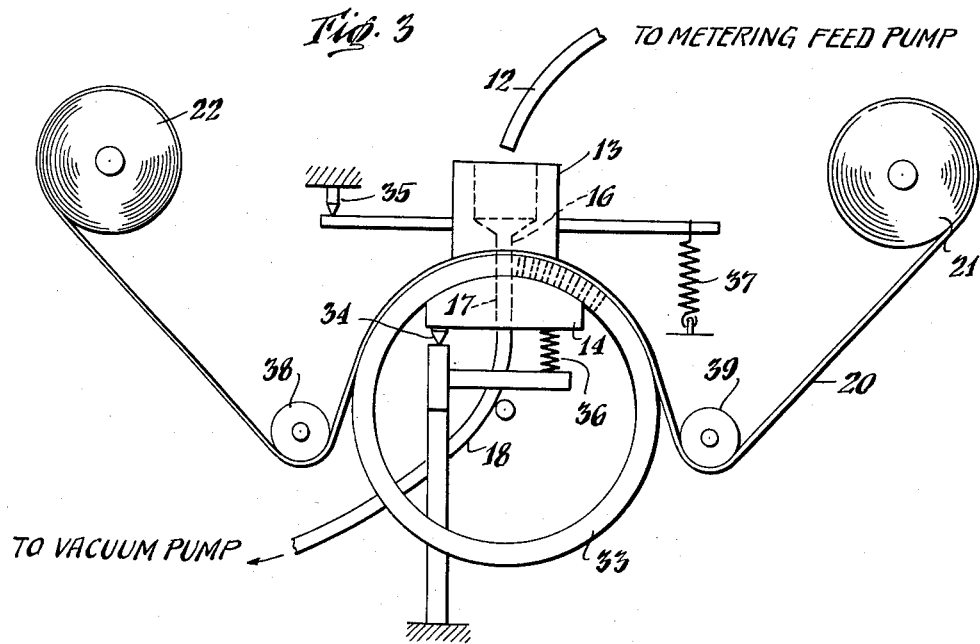
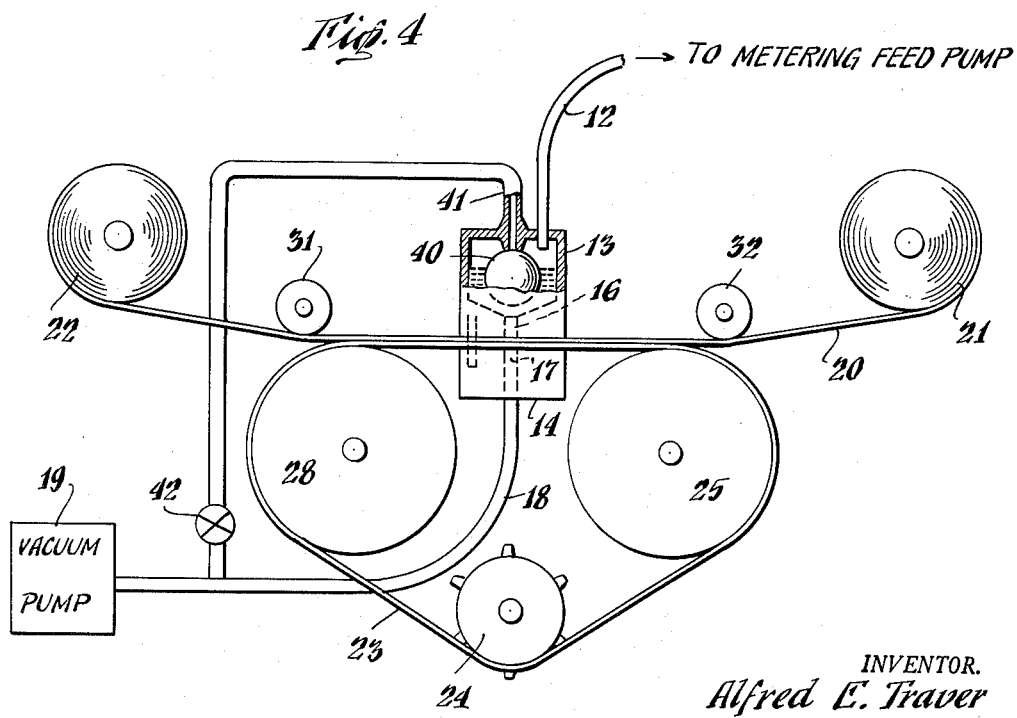
INVENTOR.
Alfred E. Traver
BY
ATTORNEY

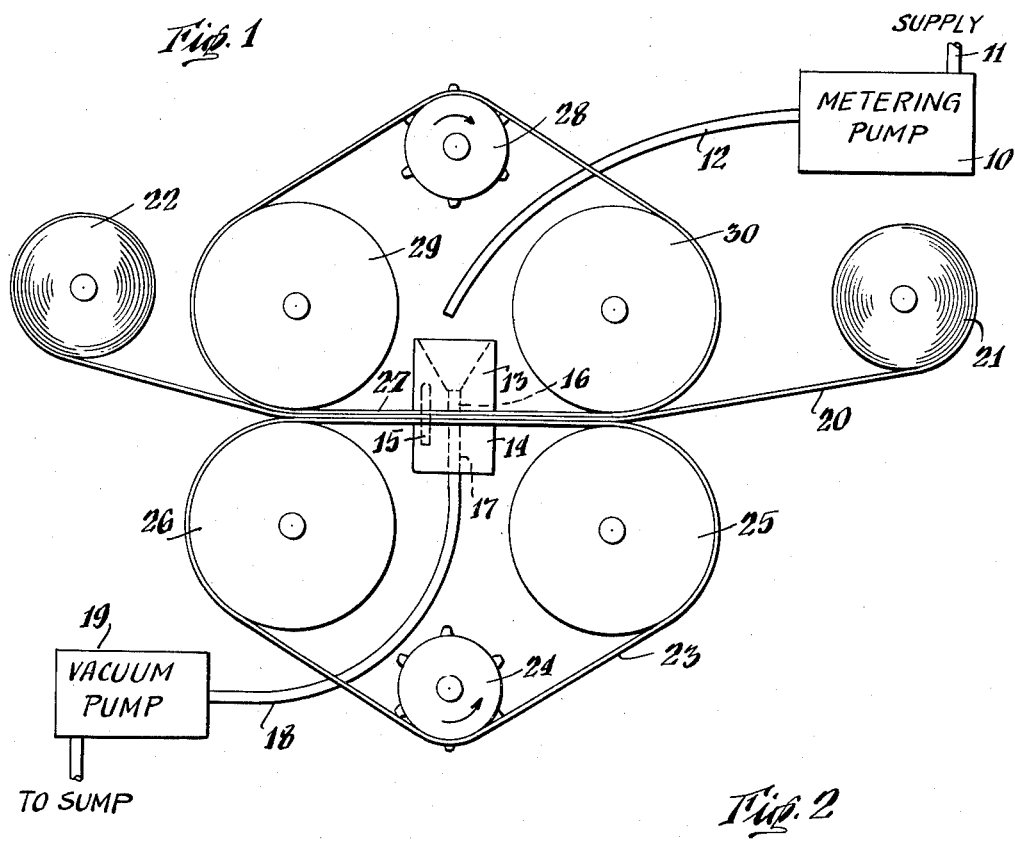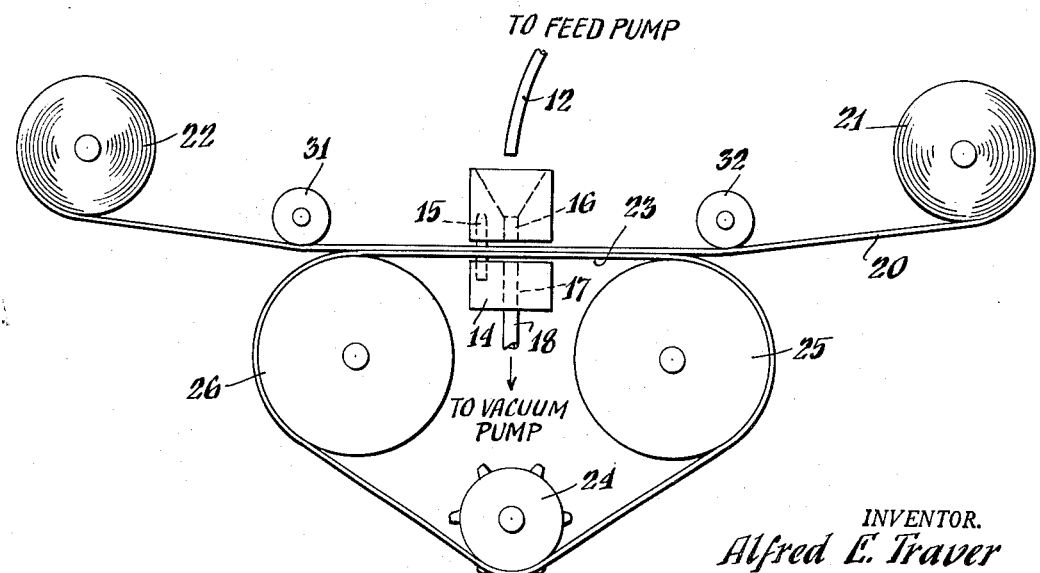

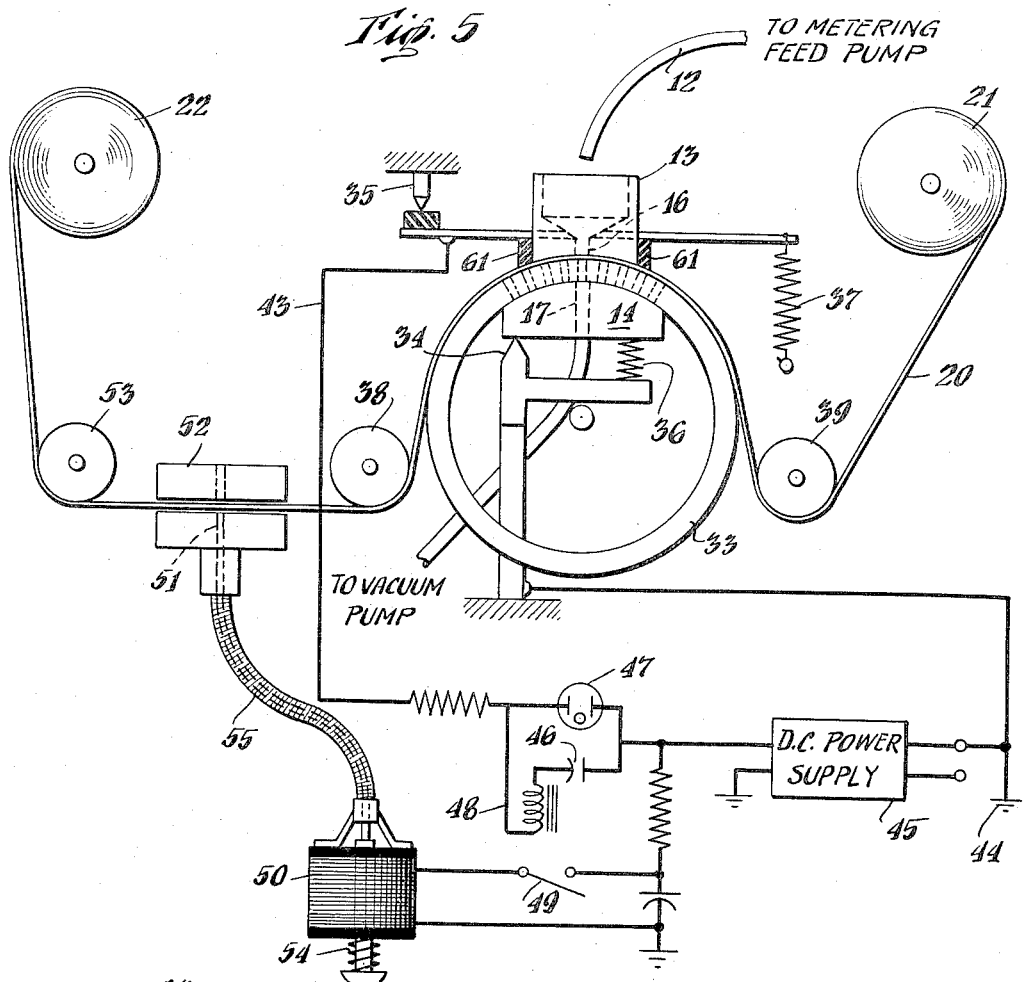
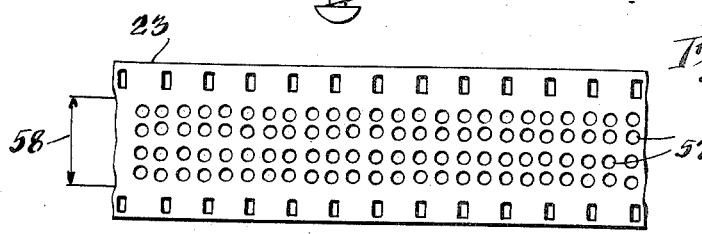
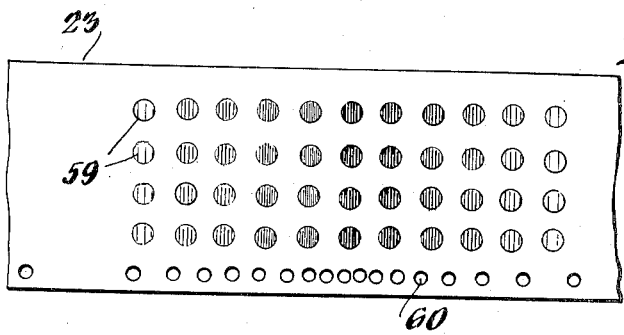

United States Patent Office 2,734,377
Patented Feb. 14, 1956

2,734,377
APPARATUS FOR DETECTING CONTAMINATION OF A LIQUID

Alfred E. Traver, Great Neck, N. Y., assignor to Socony Mobil Oil Company, Inc., a corporation of New York Application October 6, 1952, Serial No. 313,341

1 Claim. (Cl. 73—53)

This invention is directed to an apparatus for continuously examining a liquid to determine contamination thereof, as by suspended solid matter, and in the case of hydrocarbon liquids, by water.

It is particularly directed toward providing an instrument for continuously examining a hydrocarbon liquid, such as gasoline, kerosene, and the like for sediment, water, etc., and providing a continuous, permanent record of such contamination.

The necessity for such examination becomes apparent when it is considered that at present great volumes of petroleum products are moved from refinery storage points to storage points near areas of final consumption through pipe line systems often many hundreds of miles in extent. Sediment, such as rust, as well as sediments which may arise from internal oxidative reactions and the like in such middle distillate products as domestic furnace oil, diesel fuel, and the like, should be barred from entry to the transportation system, or if formed in transit, the product should be diverted for cleaning. Rust contaminates and colors light colored petroleum products and is an indication of corrosion of equipment. Water promotes internal corrosion of pipe lines. Obviously a continuous, certain method for the detection of such contaminants is desirable.

The usual procedure for determining the quantity of material in suspension is to draw a sample and remove it to a laboratory for a filter test. This requires the time and attention of a sampler and also introduces a considerable time lag before the sediment in the sample is recorded. The conventional procedure will not record changes in product which occur between the sampling periods. This is especially true in sampling pipe line products where the quality of the product may change very rapidly. A change in supply tanks or a change in pumping rate may cause a slug or sediment or water to be entrained which will pass through the pipe line and contaminate a tank of product at the discharge end. Such a slug of sediment probably would not be detected by the usual sampling methods, and if detected the quantity would not be known.

This invention provides a continuous sampling device which removes a small stream of product from a pipe line or tank and passes it through a small area of clean filter paper. The filter element is in continuous motion. A filter fiber passes through the filtering zone in a definite period of time. The filter element which is a strip of filter paper, will provide a record of the cleanliness of the product for a period of any desired length.

In order that the record shall be quantitative, the product is fed to the filtering zone by a constant displacement metering pump. Each unit area of the filter element filters the same quantity of product. The density of the sediment on the filter element is a permanent record of the quantity of suspended material in the pipe line or tank product.

This device is an improvement over known methods in that the apparatus will function unattended for a long period, and will give a quantitative, permanent record of the filterable material in a pipe line or tank product.

In order that this device may be understood more readily, reference is now made to the several drawings which are attached to and made a part of this specification, wherein the apparatus, in several versions, is set forth in diagram form.

In these drawings:

Figure 1 shows a basic form of the device;

Figures 2 and 3 show modifications in the basic form;

Figure 4 shows a useful control feature which may be added;

Figure 5 shows an adaptation useful for the detection of water in hydrocarbons;

Figure 6 shows a useful pattern of perforations in the perforated support; and

Figure 7 shows a sample tape, showing both sediment and water having been found.

Turning now to Figure 1, and remembering that these figures set forth the apparatus in diagram form, 10 is a metering pump, capable of delivering an adjustable, determinable amount of liquid per unit of time. Several types of such pumps are available. This metering pump takes suction at 11 from the stream or supply of liquid which is being sampled. Various forms of arrangements suitable for continuously sampling a tank or a flowing stream or liquid are known. Any suitable one may be used here. The metered, substantially continuous sample is passed through pipe 12 to feed chamber 13. Below feed chamber 13 is a vacuum plate 14, held in register with feed chamber 13 by pins 15, so that slot 16 leading from the feed chamber 13 is in register with slot 17 in the vacuum plate 14. Liquid is drawn from vacuum plate 14 (slot 17), through pipe 18 by vacuum pump 19, and disposed of. Between feed chamber 13 and vacuum plate 14 there is interposed a filter medium 20, in tape form, continuously fed from roll 21 and rewound on roll 22. Liquid passing from feed chamber 13 to vacuum plate 14 must pass through filter tape 20, and sediment, etc., therein, is separated by and held upon the filter tape 20.

The following arrangement is used to position, drive, and support the filter tape 20. Below the filter tape 20 there is provided an endless perforate belt 23, provided with sprocket holes along one or both sides, driven by sprocket 24 and held in place by rolls 25 and 26. Above the filter tape 20 there is provided another endless perforate belt 27, similarly driven by sprocket 28 around guide rolls 29 and 30. Sprockets 24 and 28 are driven at a uniform synchronized rate, so that perforations in endless belt 23 and perforations in endless belt 27 remain in register and while these belts hold, drive, and support the filter tape, the liquid from feed chamber 13 may pass through the filter area thus provided into the slot in vacuum plate 14. Filter tape rewind roll 22 may have any appropriate form of drive, or in some cases may be manually operated. In any event, it must be arranged so that the tape thereon may be inspected or removed at will.

It will be understood that flanges are or may be provided upon any of the various rolls, such as 22, 26, 25, 29, 30, 21, and even upon the feed chamber 13 or vacuum plate 14, or any other tape carrying device, as necessary or desirable to assist in properly positioning filter tape 20. Also, rolls 29 and 30 need not be axially aligned with rolls 26 and 25 respectively, so long as these pairs of rolls are so positioned that belts 23 and 27 together take hold of and drive filter tape 20.

Figure 2 shows a simpler form of the same device, and in this figure parts also found in Figure 1 are numbered as in Figure 1 and will not be again described. In this form only one perforate endless drive belt 23 is used, and the filter tape is held thereon by guide rollers 31 and 32. In this form, if filter tape of reasonable strength is used, the drive is substantially as positive as in Figure 1. There is, however, one difference, which in some cases may dictate preference for the set up of Figure 1. In Figure 2 the feed chamber 13 must be closely positioned with respect to the upper surface of filter tape 20. This limits the amount of sediment that may be deposited upon the filter tape 20, while in the arrangement of Figure 1, the amount of deposit is limited only by the thickness of upper endless belt 27.

Figure 3 shows another form, open to the same objection as above over Figure 1, but otherwise more adaptable and probably more readily and accurately manufactured. In Figure 3 there is shown feed pipe 12, feed chamber 13, vacuum plate 14 and disposal pipe 18 as before, with a filter tape 20 and tape rolls 21 and 22. In this case a motor driven drum, preferably of metal, mounted suitably on axles not shown, and having a perforate side wall is arranged to pass between feed chamber 13 and vacuum plate 14. These members are now provided with arcuate surfaces to match the drum wall 33, and may preferably be provided with pivoted, spring-biased mountings, as shown at 34 and 35 (pivots), and 36 and 37 (springs), to urge them into proper contact with the respective surfaces of the perforate drum wall 33. Filter tape 20, supported by perforate drum wall 33 and held into contact therewith by guide rolls 38 and 39, passes between feed chamber 13 and vacuum plate 14 as before. It is advisable to use register pins or other means for keeping feed chamber 13 and vacuum plate 14 in register, as before, although in this figure they have been omitted to avoid confusion with the showing of perforations in drum wall 33.

In all forms of this device the width and thickness of the filter tapes, its rate of motion, and the form and size of the perforations in the endless belts 23, 27, and perforate drum wall 33 are susceptible to wide variation. In one embodiment, built in accordance with Figure 1, the sprockets 28 and 24 were sprockets designed to handle standard 35 mm. camera film, and the endless belts 23 and 27 were lengths of such film, perforated with circular holes, arranged in groups of four across the width of the film between sprocket holes. The filter tape was of paper, of width the same as the endless belt, i. e., about 1 3/8" wide. Such a strip, driven at 6" per hour will give a record covering twenty-five days per a roll 300 feet long. In this embodiment, the slot in the vacuum plate 14 was 3/16" wide and 1/2" long in the direction perpendicular to belt travel. Under the conditions set forth above, the density of sediment in any spot upon the filter tape is representative of the quantity of suspended material in the liquid samples, averaged over a two minute period (the time for a point in the tape to pass over the noted slot).

The endless belts may be of any suitable material. In the above pilot model, they were a plastic, i. e., camera film strip. They would preferably be made of metal, such as stainless steel or other suitable metal. In the form shown in Figure 3 the perforate member is the metal drum side wall 33, and it is obvious that more latitude of material, perforation, etc., is available in this design.

A very useful adjunct is shown in Figure 4. This figure has the main features of Figure 2 and they will not be discussed again. It is desirable to control the vacuum applied to vacuum plate 14 in conjunction with the amount of feed available in feed chamber 13 to prevent sucking the feed chamber dry with possible rupture of the filter tape 20 or other difficulty. To this end, filter chamber 13 is provided with a ball valve, consisting of a ball 40 floating upon the liquid therein, and acting, with suitable guides, not shown, to close the end of a bleed pipe 41 where it rises thereagainst. This bleed pipe 41 communicates through a valve 42 (normally open) with vacuum pipe 18. When there is a sufficient supply of liquid in feed chamber 13, the ball 40 closes bleed pipe 41. When the liquid level drops too low, 41 is opened, and the vacuum in pipe 18 is released, permitting liquid buildup in feed chamber 13.

Figure 5 shows an addition to the apparatus to give a continuous determination of water in a hydrocarbon product. It is shown as applied to the form of the apparatus previously set forth in Figure 3. Since like parts appear, with like numbers and identical functions, they will not be discussed except where pertinent to this figure. To determine water, advantage is taken of the change in conductivity of the filter tape 20 when water is absorbed therein, in the following manner. A voltage gradient is applied across the filter tape between circuit element 43 and the perforated drum wall 33, which grounds through the chassis of the apparatus, as at 44. The feed plate is insulated from the rotor 33 by insulator blocks 61, which ride upon the side flanges of the rotor 33. (In apparatus variations of Figures 1 and 2, the ground side will of course be applied through vacuum plate 14.) The current flow through this circuit, arising from D. C. power supply 45, builds up as the water content of the filter tape builds up, and is collected by capacitor 46. When the voltage across the capacitor rises to a preselected value, the capacitor 46 discharges through a gas filled tube 47, giving rise to a momentary current flow in the circuit 46, 47, 48, energizing relay 48 to close switch 49 momentarily. The closing of switch 49 energizes solenoid 50 which actuates a punch 51 which punches a hole in filter tape 20 at tape punch support 52, the filter tape 20 being guided therethrough by an additional guide roll 53. The greater the water content of the filter tape, the greater its conductivity and the more frequent the actuation of the punch, so, closely spaced holes mean high water content. It is desirable to have the punch mechanism spring biased to the open position by spring 54, and the punch is shown as actuated through a flexible shaft 55 since it will be desirable to house the electrical devices in a vapor proof cabinet. Other forms of electrical circuit for accomplishing a similar result, i. e., punching or marking the tape with marks whose spacing indicates the degree of presence of water, said marking being initiated by the conductivity of the filter tape 20 when wet, will occur to those skilled in the art. The circuit values indicated in the drawing are examples of those found appropriate in a working unit.

The usual procedure for measuring the water suspended in petroleum products is to obtain a representative sample and send it to the laboratory for analysis. This procedure takes considerable time so the laboratory report may come too late to be of use. In the case of a product passing through a pipe line, the sampling technique may miss detecting slugs of water which pass infrequently. The above device permits detection of such slugs.

Figure 6 shows one of the endless belts used in the apparatus form of Figures 1 and 2. There is shown the belt 23, with its sprocket holes 56 and its perforations 57. These perforations are arranged to fall well within the center area of the filter tape, the width of which is indicated at 58. They are also arranged to cover the width, perpendicular to the belt 23 of the slot 17 in vacuum plate 14. (See Figures 1 and 2.) The exact form and arrangement of the perforations is a matter of choice, dictated by trial.

Figure 7 shows a length of filter tape 20 which records the passage of a slug of water and sediment. In the center of the tape is a group of spots 59, increasing in density as the slug arrives, and decreasing in density after it has passed along the pipe line. At the bottom edge there is a row of punch marks 60, spaced widely where there is little water, and spaced closely at the time of passage of the slug.

(The data on this tape is diagrammatically foreshortened and rearranged for purposes of explanation, particularly the water-mark punchings, since they will usually be absent for quite long times in the absence of water, and also, for convenience of apparatus arrangement (see Figure 5) will usually occur at a point upon the tape length spaced away from any sediment slug with which they may be associated. These things are taken care of in known manner by time markings upon the tape or by scaling of the tape.)

This instrument when installed in conjunction with a pipeline, has been found capable of giving a continuous record of the cleanliness of the liquid flowing therein. Reasonably frequent visual inspection of the tape record permits supervision of the transmission or diversion of product at points farther along in its travels, as dictated. Normally, such petroleum products are clean, and require little corrective diversion. When contamination does occur, it usually occurs in slugs, and these slugs will be missed by most methods of sampling. Since these slugs tend to hold together for long distances, and the rate of liquid travel is constant, when detected at one point they may be watched for and diverted at another.

I claim:

An apparatus for continuously indicating the quantity of impurities in the form of sediment and water in a hydrocarbon liquid that comprises a first chamber; means defining an outlet port in the bottom thereof; a second chamber; means defining an inlet port in the top of said second chamber; means to support the two chambers in spaced apart relationship with their respective ports in alignment with each other; means to supply a metered, continuous stream of hydrocarbon liquid to said first chamber; common means to withdraw hydrocarbon liquid from the second chamber and to maintain a partial vacuum therein to produce a flow of hydrocarbon liquid from the first chamber to the second chamber; means for passing a filter strip, upon which separate indications of the quantity of sediment and water in the hydrocarbon liquid can be placed, continuously at a controlled rate between the aligned ports of the two chambers; a supporting drum for said filter strip arranged to support said filter strip above the second chamber; means for rotatably mounting said drum so that on rotation the peripheral surface of the drum will travel with said filter strip at the same linear speed; means defining at least one circumferential line of equally spaced circular perforations in the surface of said drum, said perforations being so disposed that on rotation of the drum they will pass between the outlet and inlet ports of the upper and lower chambers respectively, whereby filtration of the hydrocarbon liquid occurs only when at least one drum perforation is in alignment with the outlet and inlet ports; an electrical circuit having a source of electrical power, an electrical energy storage device, a relay, and means for applying a potential across the filter strip at the point where filtration occurs, connected in series; whereby water taken up by the filter strip will produce conduction of electrical energy to the energy storage device in discrete quantities depending upon the amount of water in the filtrate; means connected across the energy storage device and the relay through which the energy storage device can discharge on reaching a pre-determined charged potential; means actuable by the discharge current through said relay to perforate the filter strip; whereby perforations will occur at irregular intervals on the strip dependent upon the amount of water and, hence, the conductivity of the filtrate.

References Cited in the file of this patent

UNITED STATES PATENTS

| | | |
|---|---|---|
| 1,797,248 | Svegvari et al. | Mar. 24, 1931 |
| 1,881,404 | Hadley | Oct. 4, 1932 |
| 2,124,411 | De Lanty | July 19, 1938 |
| 2,539,355 | Reichertz | Jan. 23, 1951 |
| 2,675,129 | Doubleday | Apr. 13, 1954 |
| 2,681,571 | Becker | June 22, 1954 |

FOREIGN PATENTS

| | | |
|---|---|---|
| 24,498 | Netherlands | July 15, 1931 |